June 2, 1964

C. V. CROCKETT ETAL 3,135,134

ENGINE-TRANSMISSION MECHANISM AND CONTROL FOR MOTOR VEHICLES AND THE LIKE

Filed Jan. 16, 1961

INVENTORS
Clarence V. Crockett &
BY Wallace M. Kennedy

C. E. James
ATTORNEY

June 2, 1964　　　C. V. CROCKETT ETAL　　　3,135,134
ENGINE-TRANSMISSION MECHANISM AND CONTROL FOR
MOTOR VEHICLES AND THE LIKE
Filed Jan. 16, 1961　　　　　　　　　　　　　　4 Sheets-Sheet 2

INVENTORS
Clarence V. Crockett &
BY Wallace M. Kennedy

ATTORNEY

June 2, 1964  C. V. CROCKETT ETAL  3,135,134
ENGINE-TRANSMISSION MECHANISM AND CONTROL FOR
MOTOR VEHICLES AND THE LIKE
Filed Jan. 16, 1961  4 Sheets-Sheet 3
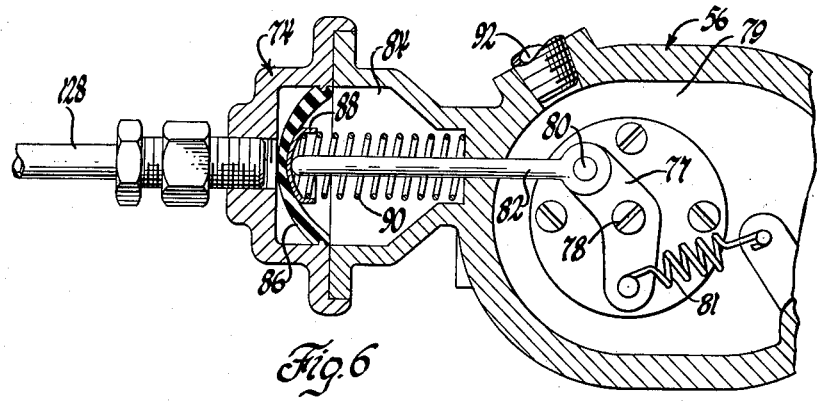
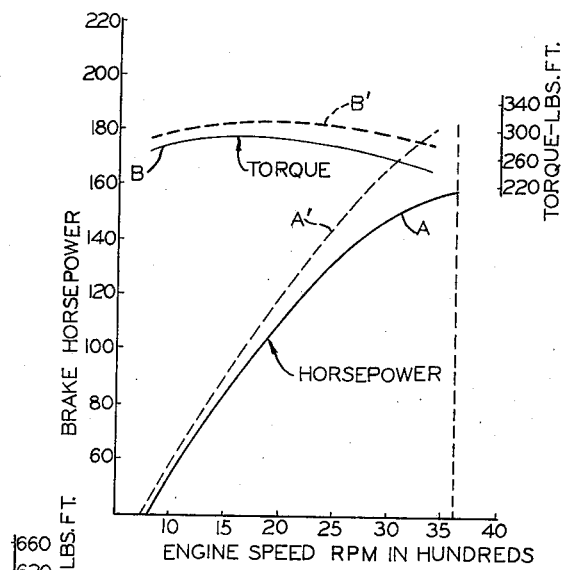
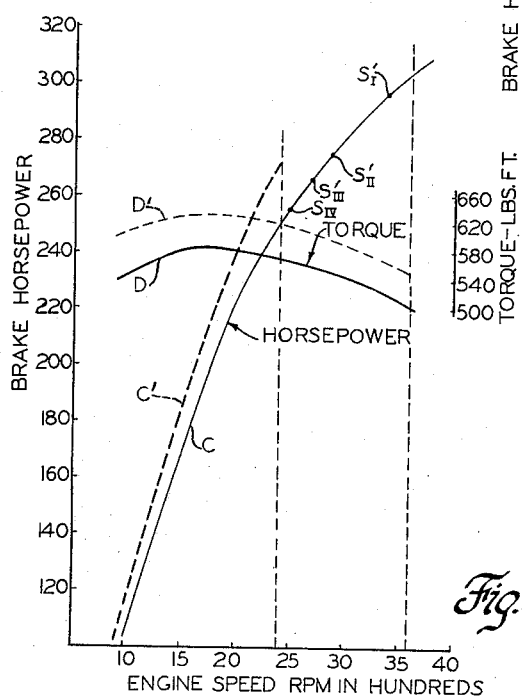
INVENTORS
Clarence V. Crockett &
BY Wallace M. Kennedy
E. E. James
ATTORNEY

United States Patent Office 3,135,134
Patented June 2, 1964

3,135,134
ENGINE-TRANSMISSION MECHANISM AND CONTROL FOR MOTOR VEHICLES AND THE LIKE
Clarence V. Crockett and Wallace M. Kennedy, Bloomfield Hills, Mich., assignors to General Motors Corporation, Detroit, Mich., a corporation of Delaware
Filed Jan. 16, 1961, Ser. No. 82,791
10 Claims. (Cl. 74—661)

This invention relates generally to a motor vehicle; more particularly to a power unit for a heavy duty motor vehicle including an internal combustion engine and a transmission selectively operable to provide a plurality of different drive ratios intermediate the engine and the engine-driven load, such as the vehicle driving wheels; and with regard to certain more specific aspects of the invention to means for regulating and coordinating the operation of the engine and the transmission.

Heretofore, engines for heavy-duty trucks and highway tractors have generally been designed or selected to provide maximum horsepower characteristics sufficient to achieve and maintain a predetermined schedule of level highway speeds under rated gross vehicle load. In other words, the maximum peak horsepower selected has generally been equal to or slightly in excess of that required for driving the loaded vehicle at a maximum level road speed of about 55 miles per hour, the present legal limit for such vehicles in most States. Acceleration performance has been of limited consequence. Since the maintenance of desired schedules is a prime consideration in the economy of any trucking operation, however, such a limited power engine must be operated at or near its maximum rated horsepower and speed irrespective of the truck road speed. To permit such engine operation, it has been necessary to provide a relatively heavy, expensive and complicated multi-shift transmission having a considerable number of closely spaced drive gear ratio steps and to shift the transmission to accommodate slight terrain effected load changes to allow engine operation to be retained at or near peak power and speed. Due to the excessive cost and complication of providing and maintaining suitable automatic shift operation, such multi-shift transmissions have been generally manually operated. With a heavily loaded truck, this arrangement necessitates a continual shifting of the transmission to maintain proper engine speed. Such continual shifting impairs truck operating performance and efficiency and is both fatiguing and distracting to the operator and generally reduces his driving efficiency and alertness.

Since the displacement or power of an engine may be increased very economically both in cost and weight, the invention generally contemplates using an engine having approximately twice the displacement and power normally required to maintain the desired maximum straightaway or level road speed under rated gross vehicle load. The torque characteristic of the proposed oversize engine is thus substantially above that of an engine of a size normally used for such application and provides an increasing torque increment with decreasing engine speed over the upper speed range and remains substantially constant in the intermediate speed range of the governed engine. This oversize engine is coupled to the drive train of the vehicle and the several vehicle driving wheels through a relatively simple and inexpensive heavy duty transmission having a limited number of shifts. Such a transmission may be of either an automatic or manual shift type.

In accordance with the invention, the oversize engine is governed at an intermediate speed substantially below the rated speed of the engine thereby limiting the available horsepower and the maximum vehicle driven speed under normal vehicle operating conditions through the high-speed gear ratio of the transmission. To provide adequate vehicle acceleration characteristics through the lower speed gear ratios of such a limited shift transmission under rated gross vehicle load operating conditions, an engine governor of simple hydraulic type is provided having a time delayed response characteristic permitting the engine to substantially overrun the governed speed and power under wide-open throttle vehicle accelerating conditions in low speed gear ratio. This permits the transmission to be upshifted to the next intermediate speed gear ratio at a relatively high engine speed at or near peak torque.

As the transmission is progressively upshifted through its several intermediate speed gear ratios, further acceleration of the vehicle occurs but the degree of engine governor overrun permitted by the time delay factor is progressively reduced. Under such wide-open throttle vehicle accelerating conditions, the several transmission gear shifts may be automatically or manually effected as the vehicle sequentially achieves scheduled road speeds corresponding to the engine governor overrun conditions permitted in each gear ratio. Such overrun permits the transmission to be upshifted at higher road and engine speeds and together with the torque speed characteristic of the engine minimizes road speed discontinuity during each shifting period and the period of acceleration required in each of the low and intermediate speed drive gear ratios. Hence, the power plant of the invention provides substantially improved vehicle acceleration over the entire speed range of the vehicle.

Another advantage of the invention is that the engine is normally operated within the upper portion of its governor limited speed range under normal vehicle operating conditions with a minimum of shifting to maintain desired road speed. This type of engine operation increases engine operating economy and reduces maintenance and service costs. While the cost and weight of the oversize engine is necessarily greater than that of a smaller, lower power engine conventionally used, the permitted simplification of the transmission results in the total cost and weight of the engine transmission power unit being comparable to or substantially less than that of a conventional type installation. The instant invention has the further advantage of substantially reducing the number of engine and transmission combinations, sub-assemblies and parts which the individual manufacturer must otherwise necessarily provide and stock to meet the wide range of size load and operating requirements for various types of heavy duty trucks, highway tractors, off-the-road equipment and other types of vehicles.

With regard to certain of its more specific aspects, the invention contemplates an engine of the size indicated essentially comprising two conventional size engines structurally combined in tandem and having maximum parts and manufacturing interchangeability therewith using the same production tooling and assembly facilities. The fore and aft portions of the engine are provided with separate charge forming induction systems which are interconnected to insure the equalization of pressure therebetween and thus the distribution of developed power between the fore and aft engine portions.

The foregoing and other advantages, objects and features of the invention will be more thoroughly understood from the following description of a preferred illustrative embodiment thereof having reference to the several drawings, in which:

FIGURE 6 is an enlarged sectional view of a second portion of the governor mechanism;

FIGURES 7 and 8 are graphs showing the developed and available horsepower and torque characteristics respectively of an engine of the size conventionally used for such heavy-duty motor vehicles and of the tandem engine of the illustrative embodiment;

Figure 1:
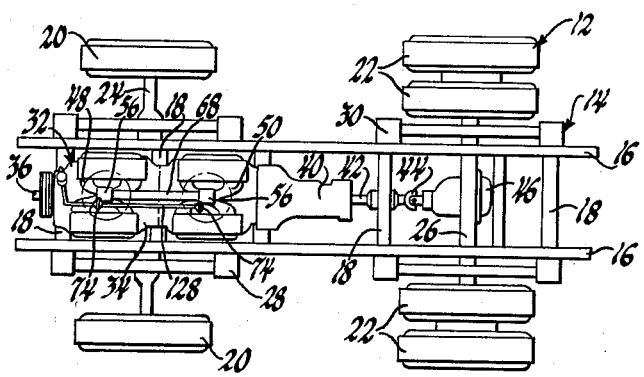
FIGURE 1 is a simplified elevational view of a heavy-duty highway tractor chassis including an internal combustion engine and a limited shift multi-speed transmission power unit having engine speed responsive and time delayed governor regulation of the charge forming induction system in accordance with the invention.

Referring more particularly to FIGURE 1, the chassis of a heavy-duty cab-over-engine tractor is indicated generally by the numeral 12 and includes a frame 14 consisting of two longitudinally extending frame members 16 and a plurality of transverse or cross frame members 18. Front and rear wheels 20 and 22 are rotatably mounted on front and rear axle assemblies 24 and 26 which are carried by and support the frame 14 through conventional front and rear suspensions 28 and 30. A twelve-cylinder V-type internal combustion engine 32 is resiliently supported in a conventional manner by three of the cross frame members 18 extending transversely of the forward portion of the vehicle frame. The engine 32 is of a carburetor charged, spark ignition type and is essentially two six-cylinder V-engines structurally integrated in tandem to provide a common engine block 34. A common crankshaft 36 and a common camshaft 38 are rotatably mounted in the block and sequentially time the phased operating cycles of the several piston and cylinder defined expansible combustion chambers. The engine thus provides maximum interchangeability of the various engine components, sub-assemblies and accessories and manufacturing interchangeability of the non-interchangeable components on the same production equipment as the smaller six-cylinder V-engine. The engine 32 is drivingly connected through a transmission 40 having a limited number of change speed ratios, a torque tube or drive shaft 42, a universal drive connection 44 and a single speed differential drive gear unit 46 to the rear wheel driving axle assemblies 26.

Figure 2:
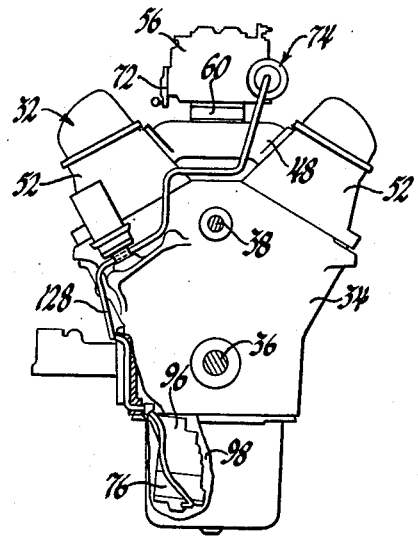
FIGURE 2 is an enlarged front elevational view of the engine of FIGURE 1 with portions thereof broken away and in section to show the mounting location and connection of several of the governor components.
Figure 4:
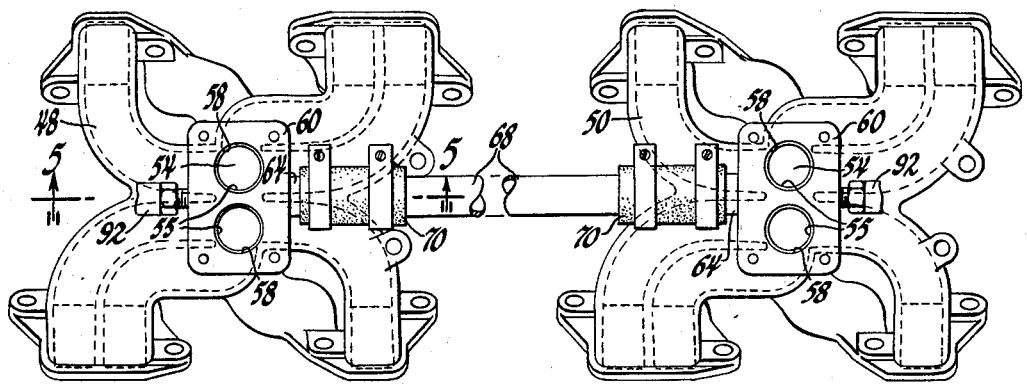
FIGURE 4 is an enlarged view of a portion of FIGURE 1 showing the separate charge forming induction systems of the fore and aft engine portions and a pressure equalizing connection therebetween.
Figure 5:
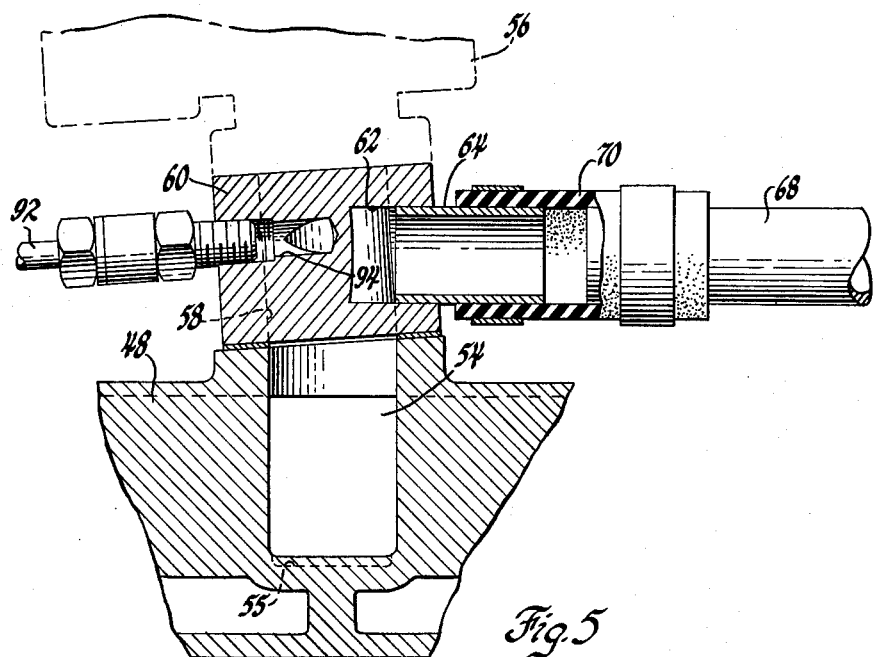
FIGURE 5 is a fragmentary sectional view showing the pressure equalizing connection between the separate induction systems in greater detail and is taken substantially in the direction of the arrows and in the plane of the line indicated at 5—5 in FIGURE 4.

As shown in somewhat greater detail in FIGURES 2 and 4, the fore and aft portions of the engine have separate interchangeable intake manifold members 48 and 50 extending transversely between the several interchangeable cylinder heads 52. The intake manifold members are reversible end-for-end and each has a plurality of separate flow equalizing passages interconnecting a central inlet chamber 54 with the several intake passages of the cylinder heads connected thereto. As best seen in FIGURE 5, the central inlet chamber 54 of each manifold is connected to outlet ports of a two-barrel carburetor 56 through openings 58 provided in a carburetor mounting adapter or spacer plate 60. The bottom wall of the inlet chamber of each manifold is provided with two shallow sump defining recesses 55 coaxial to and opposite the carburetor outlet ports and the spacer plate openings 58. These sumps and the central portion of each manifold are heated by an exhaust gas cross-over, not shown, which extends between the adjacent cylinder heads. The openings 58 of each plate are intersected by a bore 62 which sealingly supports a cylindrical connector tube 64 and the spacer plates are secured to mounting flanges 66 on their respective manifold members so that these connector tubes face each other. A pressure equalizing tube 68 extends longitudinally between and is sealingly connected at its opposite ends to the spacer plate mounted connector tubes 64 by flexible tube connectors 70. This connection between the spacer plates serves to equalize the intake vacuum pressure in the spaced manifold members as applied to their respective carburetors and thus equalizes the fuel-air charge supplied and the power developed in the fore and aft portions of the engine.

The throttle valves of the spaced carburetors 56 are interconnected through a linkage 72 for synchronous movement between closed and wide-opened fuel supply controlling positions in accordance with the actuation of a manual throttle control, such as an accelerator pedal in the vehicle cab. As best seen in FIGURE 6, a pressure responsive governor servo 74 is mounted on each carburetor opposite the linkage 72 and is operable by oil pressure supplied thereto to carry the throttle valve of its respective carburetor in a valve closing direction, overriding the operative position of the linkage 72. This supply of actuating oil pressure to the governor servo occurs whenever the engine reaches a governor established maximum speed and is controlled by a speed responsive centrifugal spinner valve mechanism 76 which is rotatably driven and supplied by the engine oil pump. As best seen in FIGURE 8, this maximum governed speed is approximately one-third less than the engine designed maximum speed and thus serves to substantially limit the horsepower available for vehicle acceleration and propulsion.

The governor servo 74 includes a lever member 77 which is mounted on one end of a throttle valve shaft 78 within a carburetor housing defined chamber 79. This lever is pivotally connected at 80 to one end of a push rod 82 and is biased in a valve opening direction by a spring 81 tensively interposed between the lever member and the carburetor housing. The end of the rod 82 opposite the pivot 80 projects centrally of a second housing defined chamber 84. The chamber 84 is sealingly subdivided by a flexible diaphragm piston member 86 which thrustably engages the adjacent end of the push rod through an interposed cup-shaped member 88. A servo return spring 90 is compressively seated between the cup-shaped member 88 and a portion of the carburetor housing embracing the rod 82 intermediate the chambers 79 and 84. The chamber 79 and the portion of the servo chamber 84 connected thereto are normally vented to the adjacent air intake through a vent tube 92. For this purpose, the two spacer plates 60 are provided with ports 94 intersecting the side walls and passages thereof opposite the bores 62. These ports are connected to the ends of the vent tubes 92 distal from the housing defined chambers 79.

Figure 3:
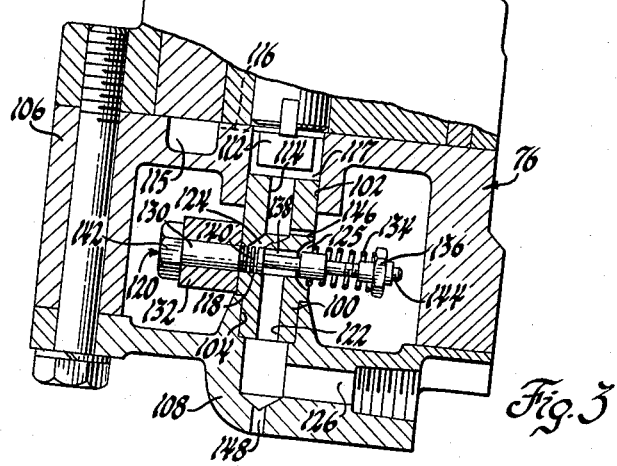
FIGURE 3 is a further enlarged view of a portion of the governor mechanism as shown in FIGURE 2 with portions thereof broken away and shown in sectional detail.

The governor control valve mechanism 76 is similar to that shown in United States Patent No. 2,736,305, entitled "Hydraulic Governor," of the instant co-inventor, W. M. Kennedy. As best seen in FIGURES 2 and 3, this control valve unit is supported by the engine driven oil pump 96 within an oil pan defined sump chamber 98. The control valve mechanism comprises a cylindrical valve body 100 journaled within aligned openings 102 and 104 forming spaced plain bearings in an oil pump cover and support member 106 and an adapter plate 108 secured thereto. The valve body 100 is coaxially and drivingly connected to the engine driven oil pump shaft 110 by a key 112. A bore 114 extends centrally of the upper valve body portion and defines a pressure inlet passage communicating with a pump discharge port 115 formed in the pump cover member 106 through a groove defined passage 116 in the pump cover member and passages formed between the journal opening 102 and a key receiving slot 117 in the valve body. A diametrical cross bore 118 extends intermediate the ends of the valve body and reciprocably mounts a centrifugally unbalanced spring biased control valve assembly 120 for rotation therewith. This diametrical cross bore is spacedly intersected by a pressure inlet port 124 extending obliquely to the upper inlet passage 114, by a pressure outlet passage defining bore 122 extending centrally of the lower portion of the valve body, and by pressure relieving ports 125 formed by diametrically notching the end of the cross bore distal from the inlet port. The outlet passage 122 of the valve body is connected through an elbow passage 126 in the adapter plate and by suitable tubing 128 to the two carburetor mounted governor control servos 74 as shown in FIGURES 1 and 2.

The control valve assembly 120 comprises a valve spool 130, a centrifugal flyweight 132, a valve biasing speeder spring 134, and a spring seating and adjusting nut 136. The valve spool 130 is slidably seated within the cross bore 118 of the valve body and has an annular groove 138 which serves to establish fluid communication between the pressure inlet port 124 and the outlet passage 122, between the outlet passage 122 and the pressure relieving ports 125, or between all three of these ports and passages depending upon the position of the valve as determined by the speed of the engine. The portion of the valve spool normally closing the inlet port 124 may be provided with a plurality of spaced circumferential grooves 140, as shown. Such grooves serve to reduce the friction of the valve spool and provide a floating action permitting relatively free and positive speed responsive movement of the valve spool within the cross bore.

The centrifugal flyweight 132 slidably embraces the valve spool and is retained on one end thereof by an enlarged integrally formed wrench receiving head 142. The valve biasing speeder spring 134 embraces the end of the valve spool opposite the flyweight 132 and is compressively interposed between a shallow spot faced recess formed in the governor valve body coaxially of the cross bore 118 and the spring seating nut 136 which is threadably adjusted on a reduced end portion 144 of the valve spool, as shown, to provide adjustment of the engine speed setting of the control valve unit. The weight of the governor flyweight 132, the adjusted compressive biasing action of the speeder spring 134, and the engine driven speed of the governor valve body thus determine the extent of valve spool movement to govern the flow of pressurized actuating oil from the pump to the pressure responsive governor servos 74.

Under normal engine operating conditions below the governed speed, the valve spool 130 is normally positioned as shown in FIGURE 3 to block the engine lubricating oil supplied to the diagonal pressure inlet port 124 in the valve body. With the valve spool in the position shown, the annular groove 138 therein interconnects the pressure relieving ports 125 and the pressure outlet passage 122 so as to relieve any fluid pressure acting on the pressure diaphragms 86 through the tubing 128 and thus references the governor servos to atmospheric pressure. Upon an increase in speed of the pump shaft 110 sufficient to cause the centrifugal flyweight 132 and the valve spool 130 to move radially outwardly of the governor valve body against the balancing force of the speeder spring 134, the valve groove 138 is moved initially into momentary registry with all three ports and passages 122, 124 and 125 opening on the cross bore 118 and is then moved into registry with only the pressure inlet port and the outlet passage 124 and 122, respectively. This interconnection causes substantially full lubricating oil pressure to be supplied through the pressure outlet tubing 128 to the diaphragm pressure chamber 84 in the pressure operated throttle overriding governor servos 74. Under normal operating conditions at or near maximum governed engine speed, the momentary application of pressure from the inlet passage 124 to both the pressure relieving ports 125 and the pressure outlet passage 122 prevents any sudden increase of pressure in the diaphragm chamber and thus prevents overshooting and consequential hunting of the governor mechanism and engine. Proper supply and regulation of pressurized oil through the control valve unit to the diaphragms of the several governor servos are insured by the provision of bleed holes 146 and 148 in the valve body adjacent the inlet port 124 and in the outlet elbow of the adapter plate, respectively.

Referring now to the comparative engine characteristic curves of FIGURES 7 and 8, and FIGURE 7 is illustrative of the torque and horsepower characteristics of a six-cylinder V-engine which is the equivalent of half of the engine of FIGURE 1. In FIGURE 7 the developed and available horsepower for vehicle propulsion of the smaller engine are represented by the broken and full line curves A' and A, respectively, and the developed and available torque are similarly indicated by the broken and full line curves B' and B. As previously indicated, the available horsepower of this engine at its designed maximum speed of 3600 r.p.m. is sufficient to drive the loaded vehicle at the desired maximum road speed but requires a multi-shift transmission having a considerable number of closely spaced drive ratio gear steps to permit adequate vehicle acceleration. In FIGURE 8, the developed and available horsepower of the twelve-cylinder V-engine of FIGURE 1 are indicated by the broken and full lines C' and C, respectively, and the developed and available torque are similarly represented by the broken and full lines D' and D. For any given speed up to the maximum designed engine speed of 3600 r.p.m., the developed and available horsepower and torque for this engine are substantially twice that of the half engine represented by FIGURE 7. The larger engine is normally governed at an intermediate speed, however, thus reducing the torque and horsepower available for vehicle propulsion and restricting road speed to the desired maximum.

Figure 9:
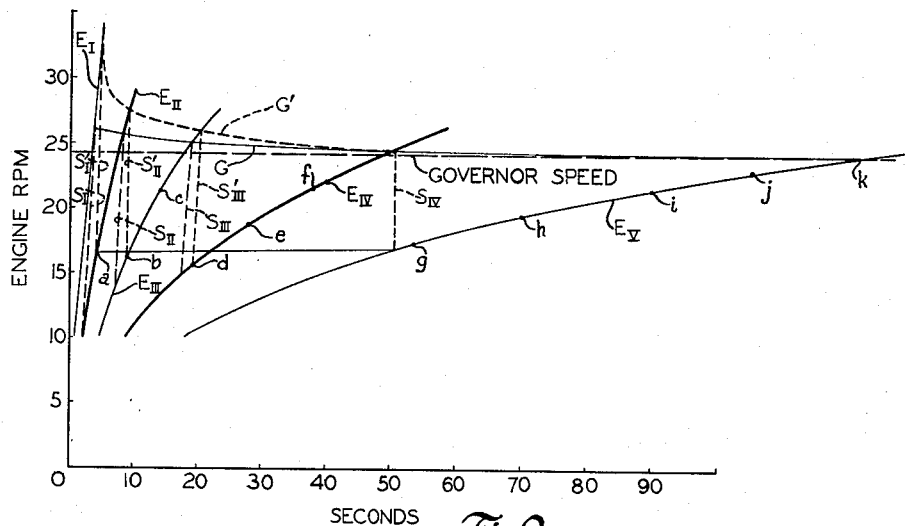
FIGURE 9 is a graph showing the engine and vehicle acceleration through the several transmission gear shift ratios with wide-open throttle overrun of the engine governor speed.

During brief periods of wide-open throttle vehicle acceleration in the lower speed drive ratios of the transmission, the time required for sufficient oil pressure to be supplied by the governor control valve unit to the throttle overriding servos permits the engine speed to briefly overrun the governor control valve speed setting. The time required for such oil pressure supply to the throttle overriding servos is dependent upon the pressure regulation provided by the vented elbow passage 126, the flow dimension of the relatively long pressure supply tubing 128 and the volumetric capacity of the two expansible servo chambers 84. In FIGURE 9, wide-open throttle engine overrun is indicated by the intersection of a broken line curve G' with the several engine acceleration curves $E_I$, $E_{II}$, $E_{III}$, $E_{IV}$, and $E_V$ which proportionally correspond to vehicle acceleration in the several drive gear ratios. The overrun indicating curve G' is in contrast to a normal governor speed characteristic represented by the full line curve G. Under wide-open throttle vehicle accelerating conditions, the permitted engine overspeed allows gear shifting between the lower drive ratios to be effected at substantially higher engine and vehicle speeds. The resultant higher rotational inertias of the engine and of the vehicle driven transmission tend to offset the increased compressive loading of the engine and the frictional loads of such motored components and limit engine speed drop-off during the shifting process. The oncoming gear ratio is thus engaged at a higher road and engine speed and at or near peak engine torque thereby minimizing the road speed discontinuity that might otherwise be expected from such a limited shift transmission. The engine speed drop-off occurring during the several gear shifting intervals are indicated by the broken lines $S_I$, $S_{II}$, $S_{III}$, and $S_{IV}$ for normal gear shifts from shift points represented by the intersections between the governed engine speed line G and the several engine acceleration curves. Where gear shifting is effected under wide-open throttle vehicle acceleration conditions, the speed drop-off in shifting between the several drive ratios is indicated by the broken lines $S_I'$, $S_{II}'$ and $S_{III}'$. The several points a, b, c, d, e, f, g, h, i, j, k, on the several engine acceleration curves indicate increments of 5 m.p.h. up to 60 m.p.h. at k for acceleration of a given vehicle load such as 60,000 lbs. combined gross vehicle weight under wide-open throttle accelerating conditions.

Figure 10:
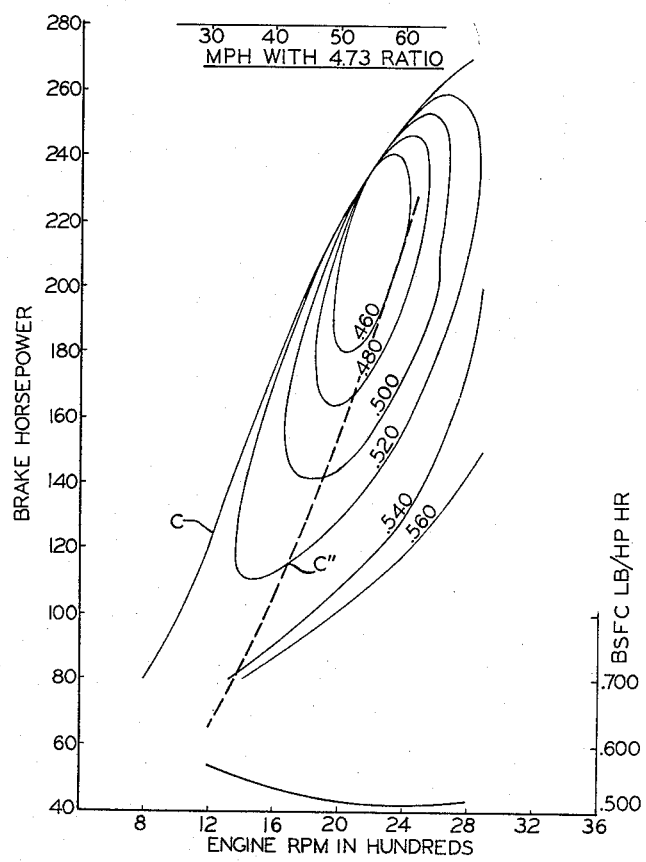
FIGURE 10 is a graph illustrative of the fuel economies and acceleration power reserves obtainable with a power plant constructed in accordance with the invention.

FIGURE 10 contrasts the available engine power output C against the power C" required to pull the illustrative 60,000 lbs. vehicle load at various stabilized level road speeds. Contrary to the usual practice, the power required by the loaded vehicle embodying the invention falls well below the available power curve. This permits the engine to be run partly throttled at any level road speed and provides a reserve of power permitting adequate vehicle acceleration with only a limited (five-speed) transmission instead of the eight or ten forward speeds usually required using a smaller engine. FIGURE 10 also shows a series of loops or closed curves indicative of equal specific fuel rates. From these fuel rate curves, it may be seen that the operation of the engine at a throttled condition along the power required curve gives substantially better economy over the normal vehicle road speed range than if the engine were required to run at or near full throttle.

From the foregoing description of a preferred illustrative embodiment, it will be appreciated that various modifications and changes might be made therefrom without departing from the spirit and scope of the invention as defined in the following claims.

We claim:

1. In a heavy duty motor vehicle including a vehicle propelling means, an internal combustion engine power plant operable between a minimum idle speed and a designed maximum speed, transmission means for drivingly connecting said power plant to the vehicle propelling means including means for selectively establishing a limited number of stepped drive ratios between said power plant and the vehicle propelling means, said power plant comprising a forward engine portion and a rear engine portion, said engine portions being structurally and drivingly integrated in tandem and each being of a size and operating characteristic providing a horsepower level at the designed maximum power plant speed sufficient to drive said vehicle under a maximum designed gross vehicle load at a desired maximum level road speed, separate charge forming means connected to each of said engine portions and operable to supply a combustible mixture thereto, means for coordinating and equalizing the combustible charge supplied by said charge forming means to their respective power plant portions, and means responsive to power plant speed and normally operable on each of said charge forming means to limit the power plant to an intermediate speed substantially below the designed maximum speed, said intermediate speed being sufficient to drive said vehicle at the desired maximum level road speed through a highest speed drive ratio of the transmission and providing a governed horsepower level substantially above the designed power characteristic level of one of said engine portions, and said speed responsive means including a means operable to retard the speed reducing action thereof under wide-open throttle vehicle accelerating conditions through the several lower drive ratios of the transmission thereby permitting the power plant to substantially overrun said intermediate speed to permit upshifting between the several lower transmission drive ratios to be initiated at higher engine and vehicle speeds with initial drive through the oncoming drive ratio being effected at or near peak engine torque with minimum road speed discontinuity.

2. In a heavy duty load carrying motor vehicle such as a truck or tractor, including vehicle propelling means, a variable speed internal combustion engine operable between a minimum idle speed and a designed maximum speed limit, said engine being of a size to provide a horsepower characteristic at the designed maximum speed substantially twice that required to drive said vehicle at a desired maximum level road speed, transmission means for drivingly connecting said engine to said vehicle propelling means and including means for selectively establishing a limited number of stepped drive ratios between the engine and vehicle propelling means, means for supplying a motive power fluid to said engine for operation between the idle and designed maximum speed limits, and governor means responsive to the speed of the engine and operable on said motive fluid supply means to limit the engine to an intermediate speed substantially below the designed maximum speed sufficient to drive said vehicle at the desired maximum level road speed through said transmission means and providing a governed horsepower level substantially above that required to drive said vehicle at the desired maximum level road speed, and time delay means associated with said governor means and operable to briefly retard the speed reducing action thereof under maximum motive fluid supply vehicle accelerating conditions through the several lower speed drive ratios of the transmission thereby permitting the engine to substantially overrun said intermediate engine speed for a limited time period allowing upshifting between at least two of the lower transmission drive ratios to be initiated at a higher engine and vehicle speed with initial drive through the oncoming drive ratio being effected at a higher engine speed and at or near peak engine torque with minimal road speed discontinuity.

3. In a heavy duty load carrying vehicle including vehicle propelling means, an internal combustion engine power plant operable between a minimum idle speed and a designed maximum speed, transmission means for drivingly connecting said power plant to the vehicle propelling means and including means for selectively establishing several stepped drive ratios between said power plant and the vehicle propelling means, said power plant comprising a forward engine portion and a rear engine portion, said engine portions being structurally and drivingly integrated in tandem and each being of a size and operating characteristic providing a horsepower level at the designed maximum speed sufficient to drive said vehicle under a maximum designed gross vehicle load at or near a desired maximum level road speed, a separate intake manifold means connected to each of said engine portions, a separate charge forming means connected to each of said manifold means and operable to supply a combustible mixture thereto, linkage means for synchronously coordinating the combustible charge supplying action of said separate charge forming means between idle and maximum power plant speed supply conditions, a fluid connection intermediate said separate manifold means for equalizing intake pressures in said separate manifold means thereby equalizing the combustible charge supplied to each engine portion, fluid pressure responsive servo means associated with each of said charge forming means and operable thereon to reduce the combustible charge supplying action thereof, means responsive to power plant speed and operable to supply actuating fluid pressure to said servo means whenever the power plant exceeds an intermediate speed substantially below the designed maximum speed, said intermediate speed being sufficient to drive said maximum gross vehicle load at said desired maximum level road speed through the highest speed drive ratio of said transmission and providing a governed horsepower level substantially above the designed power characteristic level of one of said engine portions, and means intermediate said servo and speed responsive pressure supply means and operable to briefly retard the power plant combustible charge reducing action of said servo means on said linkage means under maximum power plant and vehicle speed accelerating conditions thereby permitting the power plant to substantially overrun said intermediate power plant speed and briefly allowing upshifting between the several lower transmission drive ratios at higher power plant and vehicle speeds with drive through the oncoming drive ratio being initiated at or near peak power plant torque thereby minimizing road speed discontinuity through the several lower drive ratios of the transmission.

4. In a heavy duty load carrying vehicle such as a truck or tractor, an internal combustion engine operable between a minimum idle speed and a designed maximum speed, means for propelling the vehicle including transmission means selectively operable to establish several stepped drive ratios between said engine and the vehicle propelling means, said engine being of a size and operating characteristic providing maximum horsepower at its designed maximum speed substantially above that required to drive the maximum gross vehicle load at or near a desired maximum level road speed, a charge forming means connected to said engine and operable to supply a combustible mixture thereto between idle and maximum engine speed supply conditions, fluid pressure responsive servo means associated with said charge forming means and operable thereon to reduce the combustible charge supplying action thereof, means responsive to engine speed and operable to supply an actuating fluid pressure to said servo means whenever the engine exceeds an intermediate speed substantially below the designed maximum speed, said intermediate speed being sufficient to drive said vehicle at said desired maximum level road speed through the highest speed drive ratio of the transmission means and providing an intermediate governed horsepower level substantially above that required to drive said loaded vehicle at the desired maximum level road speed and substantially below the designed maximum horsepower level, and fluid conduit means intermediate said servo means and said speed responsive pressure supply means and operable to briefly retard the supply of fluid pressure to said servo means from said speed responsive means and the initial combustible charge reducing action of said servo means on said linkage means under maximum engine and vehicle speed accelerating conditions thereby permitting the engine to substantially overrun said intermediate engine speed and briefly allowing upshifting between the several lower drive ratios at higher engine and vehicle speeds with drive through the oncoming drive ratio being initiated at or near peak engine torque thereby minimizing road speed discontinuity through the several lower drive ratios of the transmission means.

5. In a heavy duty load carrying vehicle, an internal combustion engine, charge forming means connected to said engine including a throttle means operable to regulate the supply of a combustible mixture for operation of said engine between idle and a designed maximum engine speed condition, means for propelling the vehicle including transmission means selectively operable to establish several stepped drive ratios between the engine and the vehicle propelling means, said engine being of a size and operating characteristic providing a maximum horsepower level at the designed maximum speed substantially twice that required to drive a maximum gross vehicle load at or near a desired maximum level road speed, fluid pressure responsive servo means associated with said throttle means and operable thereon to reduce the combustible charge supplying action of said charge forming means, means responsive to engine speed and operable to supply an actuating fluid pressure to said servo means whenever the engine exceeds an intermediate speed substantially below the designed maximum speed, said intermediate speed being sufficient to drive said gross vehicle load at said desired maximum level road speed through the highest speed drive ratio of the transmission means and providing an intermediate governed horsepower level between that required to drive the vehicle at the maximum level road speed and the designed maximum horsepower level of the engine, and fluid connection means intermediate said servo means and said speed responsive pressure supply means and operable to briefly retard an initial supply of fluid pressure to said servo means from said speed responsive means and thereby the initial combustible charge reducing action of said servo means on said throttle means under maximum engine and vehicle speed accelerating conditions, thereby permitting the engine to substantially overrun said intermediate engine speed and briefly allowing upshifting between the several lower drive ratios at higher engine and vehicle speeds with drive through the oncoming drive ratio being initiated at or near peak engine torque thereby minimizing road speed discontinuity through the several lower drive ratios of the transmission means.

6. In a heavy duty load carrying vehicle, an internal combustion engine comprising front and rear engine portions structurally and drivingly integrated in tandem, each of said engine portions being of a size and operating characteristic providing a horsepower level at a designed maximum speed sufficient to drive a maximum gross vehicle load at or near a desired maximum level road speed, a separate charge forming means connected to each of said engine portions, including throttle means operable to regulate the supply combustible mixture to its respective engine portion for operation of said engine between an idle speed and the designed maximum engine speed, linkage means for synchronously coordinating the combustible charge regulating action of said separate throttle means, a fluid connection intermediate said separate charge forming means for equalizing the engine intake pressures and the combustible charge supplied therethrough to each engine portion, vehicle propelling means including transmission means for drivingly connecting said engine to the vehicle propelling means including means for selectively establishing several stepped drive ratios between said engine and the vehicle propelling means, fluid pressure responsive servo means associated with each of said throttle means and operable thereon to override said linkage means to reduce the combustible charge supplying action of its associated charge forming means, means responsive to engine speed and operable to supply an actuating fluid pressure to said servo means whenever the engine exceeds an intermediate speed substantially below the designed maximum speed, said intermediate speed being sufficient to drive said gross vehicle load at the desired maximum level road speed through the highest speed drive ratio of said transmission and providing a governed horsepower level substantially above the designed power characteristic level of one of said engine portions, and fluid connection means intermediate said servo means and said speed responsive pressure supply means and operable to briefly retard an initial supply of fluid pressure to said servo means from said speed responsive means and thus the initial combustible charge reducing action of said servo means on said throttle means under maximum engine and vehicle speed accelerating conditions, thereby permitting the engine to briefly overrun said intermediate engine speed and allowing upshifting between the several lower speed drive ratios at substantially higher engine and vehicle speeds with drive through the oncoming drive ratio being initiated at or near peak engine torque thereby minimizing road speed discontinuity through the several lower drive ratios of the transmission.

7. In an internal combustion V-engine for a heavy duty load carrying vehicle having vehicle propelling means including transmission means for selectively establishing several stepped drive ratios between said engine and the vehicle propelling means, said engine comprising front and rear engine portions structurally and drivingly integrated in tandem and individually providing a power level at a designed maximum speed sufficient to drive a maximum gross vehicle load at or near a desired maximum level road speed, a separate intake manifold means extending transversely between and connected to the V'd cylinder rows of each of said engine portions, a separate charge forming means connected to each of said manifold means and including throttle means operable to regulate the supply of combustible mixture through said manifold means to its respective engine portion for operation of said engine between an idle speed and the designed maximum engine speed, linkage means for synchronously coordinating the charge regulating positioning of said separate throttle means, a fluid connection intermediate said manifold means for equalizing the engine intake pressures and the combustible charge supplied therethrough to each engine portion, fluid pressure responsive servo means associated with and operable to override the linkage effected positioning of each of said throttle means to reduce the combustible charge supplying action of its associated charge forming means, means responsive to engine speed and operable to supply an actuating fluid pressure to said servo means whenever the engine exceeds an intermediate speed substantially below the designed maximum speed, said intermediate speed being sufficient to drive said maximum vehicle load at the desired maximum level road speed through the highest speed drive ratio of the transmission and providing a governed intermediate horsepower level substantially above the designed power characteristic level of one of said engine portions, and fluid connection means intermediate said servo means and said speed responsive pressure supply means and operable to briefly retard an initial supply of fluid pressure to said servo means from said speed responsive means and thereby the initial charge reducing action of said servo means on said throttle means thereby permitting the engine to briefly overrun said intermediate engine speed under maximum engine and vehicle speed accelerating positioning of said linkage means and allowing upshifting between the several lower drive ratios at substantially higher engine and vehicle speeds with drive through an oncoming lower drive ratio being initiated at or near peak engine torque thereby minimizing road speed discontinuity through the several lower drive ratios of the transmission means.

8. In a high-speed, heavy duty internal combustion V-engine having two V'd inline rows of cylinders, said engine comprising front and rear engine portions structurally and drivingly integrated in tandem and individually the equivalent of a V-engine of half the number of cylinders, a separate intake manifold means extending transversely between and connected to the V'd cylinder rows of each of said engine portions, a separate charge forming means connected to each of said manifold means, a throttle means associated with each of said charge forming means and operable to regulate the supply of combustible mixture through each manifold means to its respective engine portion for operation of said engine between an idle and a designed maximum engine speed, linkage means for synchronously coordinating the charge regulating positioning of said separate throttle means, a fluid connection extending between and interconnecting said manifold means adjacent the separate charge forming means respectively connected thereto, said fluid connection being operable to equalize the engine intake pressures and the combustible charge supplied therethrough to each of said engine portions, fluid pressure responsive servo means associated with and operable to override the linkage effected positioning of each of said throttle means to reduce the combustible charge supplying action of its associated charge forming means, means responsive to engine speed and operable to supply an actuating fluid pressure to said servo means whenever the engine exceeds an intermediate speed substantially below the designed maximum speed, and fluid connection means intermediate said servo means and said speed responsive pressure supply means and operable to briefly retard an initial supply of fluid pressure to said servo means from said speed responsive means and thus the initial combustible charge reducing action of said servo means on said throttle means, thereby permitting the engine to briefly overrun said intermediate engine speed to substantially higher intermediate engine speed upon maximum engine and load accelerating positioning of said linkage means.

9. In a heavy duty internal combustion V-engine having two inline rows of V'd cylinders, said engine comprising front and rear engine portions structurally and drivingly integrated in tandem and individually having the operating characteristics of a smaller V-engine having half the number of cylinders, a separate intake manifold means extending transversely between and connected to the V'd cylinder rows of each of said engine portions, a separate charge forming means mounted on and connected to each of said manifold means, a throttle means associated with each of said charge forming means and operable to regulate the supply of combustible mixture through each manifold means to its respective engine portion for operation of the engine between an idle and a designed maximum engine speed, linkage means for synchronously coordinating the combustible charge regulating positioning of said separate throttle means, and restricted passage means interconnecting said manifold means adjacent the separate charge forming means mounted thereon to equalize the engine intake pressures and the combustible charge supplied therethrough to each of said engine portions.

10. In combination with a heavy duty internal combustion engine as set forth in claim 9, a fluid pressure responsive servo means associated with and operable to override the linkage effected positioning of each of said throttle means to reduce the combustible charge supplying action of its associated charge forming means, an engine driven pressure supply pump, and means rotatably driven by said pump and operable in response to the engine proportional speed thereof to supply actuating fluid pressure to said servo means whenever the engine exceeds an intermediate speed below the designed maximum speed.

References Cited in the file of this patent

UNITED STATES PATENTS

| | | |
|---|---|---|
| 990,712 | Dieterich et al. | Apr. 25, 1911 |
| 1,424,428 | Vincent | Aug. 1, 1922 |
| 2,362,655 | Mallory | Nov. 14, 1944 |
| 2,875,635 | Fleck et al. | Mar. 3, 1959 |